United States Patent [19]

Nikaido

[11] Patent Number: 4,538,260
[45] Date of Patent: Aug. 27, 1985

[54] ELECTRONIC TIME SWITCH

[75] Inventor: Tadanobu Nikaido, Isehara, Japan

[73] Assignee: Nippon Telegraph & Telephone Public Corporation, Tokyo, Japan

[21] Appl. No.: 525,566

[22] Filed: Aug. 22, 1983

[30] Foreign Application Priority Data

Aug. 30, 1982 [JP] Japan ................................ 57-150310
Feb. 26, 1983 [JP] Japan ................................ 58-31651
Aug. 15, 1983 [JP] Japan ................................ 58-149079

[51] Int. Cl.³ ........................ H04J 3/04; H04Q 11/04
[52] U.S. Cl. ........................................ 370/66; 370/112
[58] Field of Search ........................... 370/112, 68, 66

[56] References Cited

U.S. PATENT DOCUMENTS 3,614,327 10/1971 Low ..................................... 370/112
3,754,100 8/1973 Jacob ..................................... 370/66
4,344,170 8/1982 Arita ..................................... 370/68

Primary Examiner—Douglas W. Olms
Assistant Examiner—Frank M. Scutch, III
Attorney, Agent, or Firm—Charles E. Pfund

[57] ABSTRACT

There are provided first and second units each comprising first and second serially connected registers receiving inputs at different timings and a switch connected on the output side of the second register. The output sides of the switches of the first and second units are commonly connected together to form a pair, and a plurality of pairs are arranged in the form of a tree. Control signals having different control timings of the switches are sequentially applied to respective switches of each stage at a predetermined time spacing. The first register of the first stage constitutes a portion of data receiving means, and sequentially stores sequentially given data at a first timing. The second registers of the first stage are supplied with a common frame pulse to take in contents of respective first registers, while the first registers of the second and following stages sequentially store data at a third timing synchronous with but different from the second time.

9 Claims, 37 Drawing Figures

ELECTRONIC TIME SWITCH

BACKGROUND OF THE INVENTION

This invention relates to an electronic time switch, and more particulaly an electronic time switch capable of electronically interchanging the order of given input information, for example.

The time switch of this type is used to randomly read out data written into a memory device in a predetermined order according to an address designation order based on connection information as in a speech path switch of a digital telephone exchanger. Since a data line connected with a plurality of cells is driven by a memory output, the operating speed of such time switch is lower than those of a register and a logic gate so that such time switch can not be used in a high speed speech path as in the case of an exchange in a wide band or a telephone exchange utilizing a satelite.

Although a time switch utilizing a multiplexer constituted by a shift register and logic gates has been proposed as a time switch not utilizing a memory device, it is constructed to simultaneously select based on a single address information. Where it is desired to construct a large scale time switch, it is essential to use a multi-input OR gate cirucuit which not only decreases the operating speed but also increases the size of the decoder and the number of control lines, thus failing to obtain a practical time switch gate matrix type switch is disclosed in U.S. Pat. No. 4,344,170 in which a plurality of multiplexers of the number equal to that of the data are operated in parallel for the purpose of compensating for the decrease in the operating speed due to the use of the multi-input OR gate circuit. With the system disclosed in this patent, even when the multiplexers operate at a low speed, an exchange speed equal to that of the shift register can be obtained so that a time switch having an extremely high speed can be realized. However, since this system requires a number of hardware components equal to the square of the degree of multiplexing it has been difficult to obtain a large scale system.

SUMMARY OF THE INVENTION

A principal object of this invention is to provide an improved electronic time switch.

Another object of this invention is to provide an electronic time switch capable of decreasing the number of component parts and increasing the capacity over that of the prior art while maintaining as high a operating speed as the prior art switch.

Still another object of this invention is to provide a novel electronic time switch also capable of decreasing the dynamic power.

Noting the fact that simultaneous selection of the prior art prevents development of electronic switches of large scale, we have improved such switches to provide parallel operative in the form of a tree with a certain speed of operation.

To attain these and other objects, according to this invention, there are used first and second units each comprising first and second serially, connected registers receiving inputs at different times, and a switch connected on the output side of the second register. The output sides of the switches of the first and second units are commonly connected together to form a pair, and a plurality of pairs are arranged in the form of a tree. Control signals having different control timings for the switches are sequentially applied to respective switches of each stage at a predetermined time spacing. The first register of the first stage constitutes a portion of data receiving means and sequentially stores sequentially given data at a first timing. The second registers of the first stage are supplied with a common frame pulse to take in the contents of respective first registers, while the first registers of the second and following stages sequentially store data at a third timing synchronous with but different from the second timing. According to one modification, the first registers of the first stage are connected in series to constitute a portion of a shift register which sequentially shifts the data while taking in the data at a timing synchronous with a clock signal. According to another embodiment, the first registers of the first stage receive data in parallel at the same time. The data are sequentially taken in by a scanning signal sequentially given at different times in synchronism with the clock signal supplied to the first registers of the first stage from a scanning signal generating circuit having a circulation type shift register construction. In still another modification, the first and second registers and the switch described above are constituted by a single D type flip-flop circuit. According to this invention, there is provided an electronic time switch comprising first and second units each including serially connected first and second registers taking in input data at different timings and a switch on the output side of the second register, the output sides of the switches of the first and second units being commonly connected to form a pair; means for connecting a plurality of the pairs in the form of a tree in a plurality of stages; means for sequentially applying control signals having different switch connection timing at a predetermined time spacing; the first registers of first stage constituting a portion of data taking in means; the first registers of the first stage sequentially storing sequentially applied data at a first timing; means for applying a common frame pulse to the second registers of the first stage for storing contents of respective first registers; first registers of second and succeeding stages sequentially storing data at a second timing; and the second registers of the second and following stages sequentially storing data at a third timing synchronous with, but different from, the second timing, thereby sending out data stored at a predetermined timing at a different timing.

BRIEF DESCRIPTION OF THE DRAWINGS

In the accompanying drawings

DESCRIPTION OF THE PREFERRED EMBODIMENTS

Figure 1:
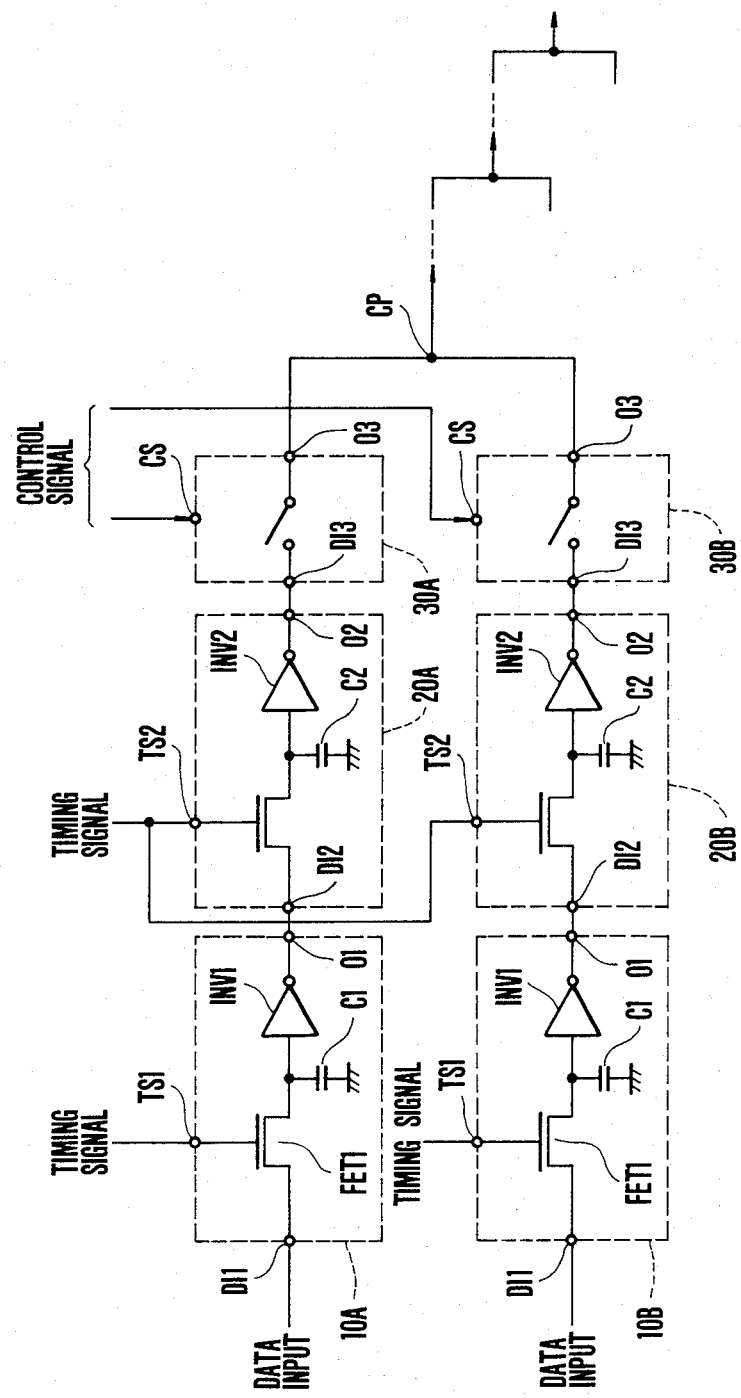
FIG. 1 is a connection diagram showing the basic construction of an electronic time switch embodying the invention.

Referring now to FIG. 1 showing the basic structured element of the elctronic time switch of this invention, reference numerals 10A and 10B designate first registers each having a data input terminal DI1, a timing signal input terminal TS1 and an output terminal O1. Each register stores the data inputted to the data input terminal DI1 in accordance with a timing signal applied to the timing signal input terminal TS1 and its output is sent out from the output terminal O1. In this example each first register is constituted by a field effect transistor FET1 constituting a transfer gate circuit and an inverter INV1. The data input terminal DI1 is connected to one of the output electrodes of the field effect transistor FET1, while the input of the inverter INV1 is connected to the other output electrode of the field effect transistor. The control electrode of the field effect transistor FET1 is connected to the timing signal input terminal TS1. With this construction, upon application of the timing signal on the timing signal input terminal TS1, inputted data are stored in a capacitance C1 connected to the input side of the inverter. Where MOS or CMOS construction is used the capacitance $C_1$ is provided by the parasitic capacitance of the gate electrode of the MOS or CMOS transistor, but if desired, an independent capacitance element can be used. Reference numeral 20A and 20B designate second registers each including an input terminal DI2, a timing signal input terminal TS2 and an output terminal O2 just like the first registers 10A and 10B. Each data input terminal DI2 is connected to one of the output electrodes of a field effect transistor FET2, the timing signal input terminal TS2 is connected to the control electrodes of the field effect transistor FET2, and the other output electrode of the field effect transistor FET2 is connected to the input of an inverter INV2 through output terminal O2. Accordingly, when a timing signal occurs at input terminal TS2, the outputs of the first registers 10A and 10B are stored in capacitors $C_2$. Reference numerals 30A and 30B designate switches each provided with a control terminal CS which connections between input terminals DI3 and output terminals O3 are ON/OFF-controlled by control information or signals via control terminals CS. Each input terminal DI3 is connected to the output terminal of the inverter INV2.

In this invention, cascade connected first and second registers and the switch constitute a minimum basic structural element and adjacent basic structural elements are commonly connected on the output sides of respective switches, the outputs of respective basic structural elements being sent to succeeding stages through a common junction CP. In this example, a plurality of sets of the basic structural elements are provided and these sets are connected as a multiple stages, thus constituting a tree shaped arrangement. Actually, switches 30A and 30B are constituted by such electronic switches as AND gate circuits, for example and the common connection between the basic structural elements is achieved through an OR gate circuit.

With this construction, the data applied, on the time division basis, to the first registers 10A and 10B are latched by the second registers 20A and 20B at a predetermined timing, and the data thus latched are sequentially sent out at a predetermined timing according to control information. Moreover, as above described, since the minimum basic structural elements are arranged in the form of a tree, the number of the minimum basic structural elements can be decreased in the later stages. Therefore, the present invention ensures attainment of a larger scaled circuit with less constituting components than the prior art. Further, since the operation speed of the electronic time switch can be coincident with that of the registers storing data, a high-speed and large-scaled electronic time switch can be obtained.

Figure 2:
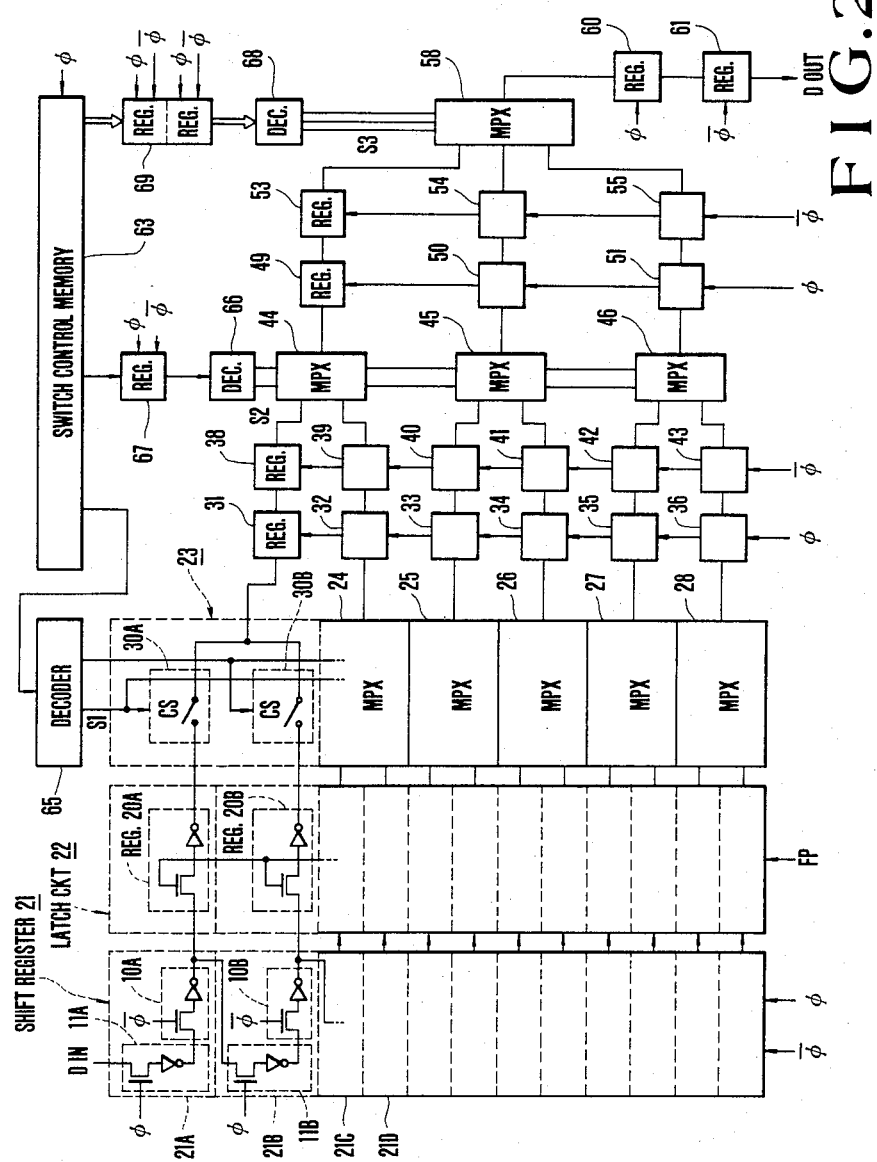
FIG. 2 is a block diagram showing the detail of the electronic time switch fabricated with a minimum number of structual elements shown in FIG. 1.

FIG. 2 shows one example wherein a plurality of the minimum basic structural elements shown in FIG. 1 are used to constitute 12 multiplex time switches. In FIG. 2, a block 21 designates a 12 stage shift register, which sequentially shifts data applied to one end according to clock pulses $\phi$ and $\bar{\phi}$. Taking stages 21A and 21B as typical examples, respective stages of the shift register 1 will now be described. Each of the stages 21A and 21B contains the first registers 10A and 10B shown in FIG. 1, and these stages are constructed to take in the input data according to the clock pulse $\phi$. These stages 21A and 21B are provided with registers 11A and 11B having the same construction as the first registers are triggered by the clock pulse $\bar{\phi}$ 180° dephased from the clock pulse $\phi$. These registers 11A and 11B are disposed at the fore stages of the first registers 10A and 10B. Data DIN is inputted to the register 11A, while the output of the first register at the fore stage 21A is supplied to the register 11B. Stages following the register 21A of the shift register 21 are constructed similarly, such that the output of the first register 10A of the fore stage is taken in by the timing action of the clock pulse $\bar{\phi}$ and then sent to the first register of the suceeding stage by the timing action of the clock pulse $\phi$.

In FIG. 2, there is also provided a 12 bit latch circuit which is parallel and simultaneously latches the contents of respective stages of the shift register, i.e., the outputs of respective first registers by the timing action of a frame pulse FP, are sent to the latch circuit 22 corresponding to the second register 20A shown in FIG. 1. There are also provided two input multiplexers 23 through 28 which selectively output a specific pair of 2 bit outputs according to a control signal S1 to be described later. Each of the multiplexers 23 through 28 corresponds to a combination of switches 30A and 30B shown in FIG. 1. The above described construction can be used for all of the shift registers 21, the latch circuit 22 and the multiplexers 23 through 28 shown in FIG. 2 and these elements constitute the first stage of the electronic time switch of this invention.

Summarizing the operation of various elements constituting the first switch of the first stage, the shift register 21 takes in the input data DIN according to the clock pulses $\phi$ and $\bar{\phi}$ and shifts the data to the succeeding stage. The latch circuit 22 simultaneously latches the data of all stages of the shift register 21 according to the frame pulse FP. The outputs of the latch circuit 22 are coupled to the input terminals of respective multiplexers 22 through 28, each of which selects and outputs either one of the two input data according to the common control signal S1.

There are provided registers 31 through 36 and 38 through 43 wherein the resisters 31 through 36 correspond to the first register 10A shown in FIG. 1, and registers 38 through 43 correspond to the second register 20A shown in FIG. 1. The outputs of multiplexers 23 through 28 are respectively taken into the registers 31 through 36 by the timing action of clock pulse $\phi$ and the outputs of these registers 31 through 36 are respectively taken in by the timing action of the clock pulse $\phi$.

Two input multiplexers 44 through 46 are provided for selectively outputting either one of two inputs according to a control signal S2 described hereinafter. Like multiplexers 23 through 28, these multiplexers 44 through 46 correspond to switches 10A and 10B shown in FIG. 1.

The component elements described above constitute the second stage of the time switch and the operation thereof will be briefly described as follows. More particularly, the outputs of registers 23 through 28 are taken into registers 31 through 36 and 38 through 43 which operate according to clock pulses $\phi$ and $\bar{\phi}$. Registers 31, 38 and 32, 39 are connected to the multiplexer 44, registers 33, 40 and 34, 41 are connected to the multiplexer 45, and registers 35, 42 and 36, 43 are connected to the multiplexer 46. In accordance with a common control signal S2, the multiplexers 44 through 46 output either one of the two inputs. As will be described later control signal S2 is produced one bit later with reference to the same address inforamtion.

Furthermore registers 49 through 51 and 53 through 55 are provided wherein the registers 49 through 51 correspond to the first register 10A shown in FIG. 1 and the register 53 through 55 correspond to the second register 20A shown in FIG. 1. The outputs of multiplexers 44 through 46 are respectively taken into registers 49 through 51 by the timing action of the clock pulse $\phi$, and the outputs of these registers are taken into registers 53 through 55 respectively by the timing action of the clock pulse $\bar{\phi}$.

There is also provided a 3 input multiplexer 58 which selects either one of 3 inputs according to a control signal to be described later. This multiplexer 58 contains three switches shown in FIG. 1 which are ON/OFF-controlled by a control signal S3.

These elements constitute the third stage of the time switch and its operation can be outlined as follows. More particularly, the outputs of multiplexers 44 through 46 respectively stored in registers 49 through 51 and 53 through 55 according to clock pulses $\phi$, and $\bar{\phi}$. The outputs of registers 49 through 51 and 53 through 55 input multiplexer 58 which selects either one of the 3 input data according to control signal S3.

Registers 60 and 61 are connected in series to the output terminal of the multiplexer 58, which are respectively driven by clock pulses $\phi$ and $\bar{\phi}$ for receiving the output of the multiplexer 58. These registers constitutes a one bit latch circuit.

It should be noted that registers 31 through 36, 38 through 43, 49 through 51 and 53 through 55 are combined with registers 36 and 38, and 49 and 53 such that they are used as delay elements to cause the multiplexer to act as a pipe line.

In this case, between a switch control memory device 63 and a decoder 68 is connected a two stage shift register 69 driven by the clock pulses $\phi$ and $\bar{\phi}$ to delay the control signal by two bits for causing the multiplexer to act at the pipe line. The switch control memory device 63 is constituted by a plurality of circulating type shift registers and holds control information applied from outside in relation to data, that is, a random address signal.

The switch control memory device 63 is storing, in an arbitrary order, 12 four bit addresses that designate either one of the 12 stages of shift register 21. The content of the memory device 63 is outputted according to clock pulses $\phi$ and $\bar{\phi}$. The addresses of the switch control memory device 63 are divided into 3 partial addresses A1 (1 bit), A2 (1 bit) and A3 (2 bits).

A one bit decoder 65 is connected to the switch control meomory device 63 for decoding one bit of the least significant bit (LSB) address A1 of the random address stored in the switch control memory device 63 for producing a control signal S1 for ON/OFF-controlling switches 30A and 30B shown in FIG. 1 paired with multiplexers 23 through 28. Also a one bit decoder 66 is provided for decoding one bit of an address A2 next to the least significant bit address A1 to form a control signal S2 for ON/OFF-controlling switches paired with multiplexers 44 through 46. Between the switch control memory device 63 and the decoder 66 is interposed a register 67 driven by clock pulses $\phi$ which $\phi$ and delays the control signal S2 by one bit for causing multiplexers 44 through 46 to act as a pipe line. The decoder 68 decodes, the most significant bit (MSB) and two bit address A3 next to the MSB for ON/OFF-controlling 3 switches in the multiplexer 58.

The operation of the time switch shown in FIG. 2 will now be described with reference to the timing charts shown in FIGS. 3A through 3J. In the following description reference is made only to clock pulse $\phi$. Actually, however, it should be noted that the latching and shifting operations are effected by the clock pulses $\phi$ and $\bar{\phi}$ of the opposite phases. A frame pulse FP shown in FIG. 3B and showing division of the frame is generated at every 12 clock pulses $\phi$.

Figure 3:
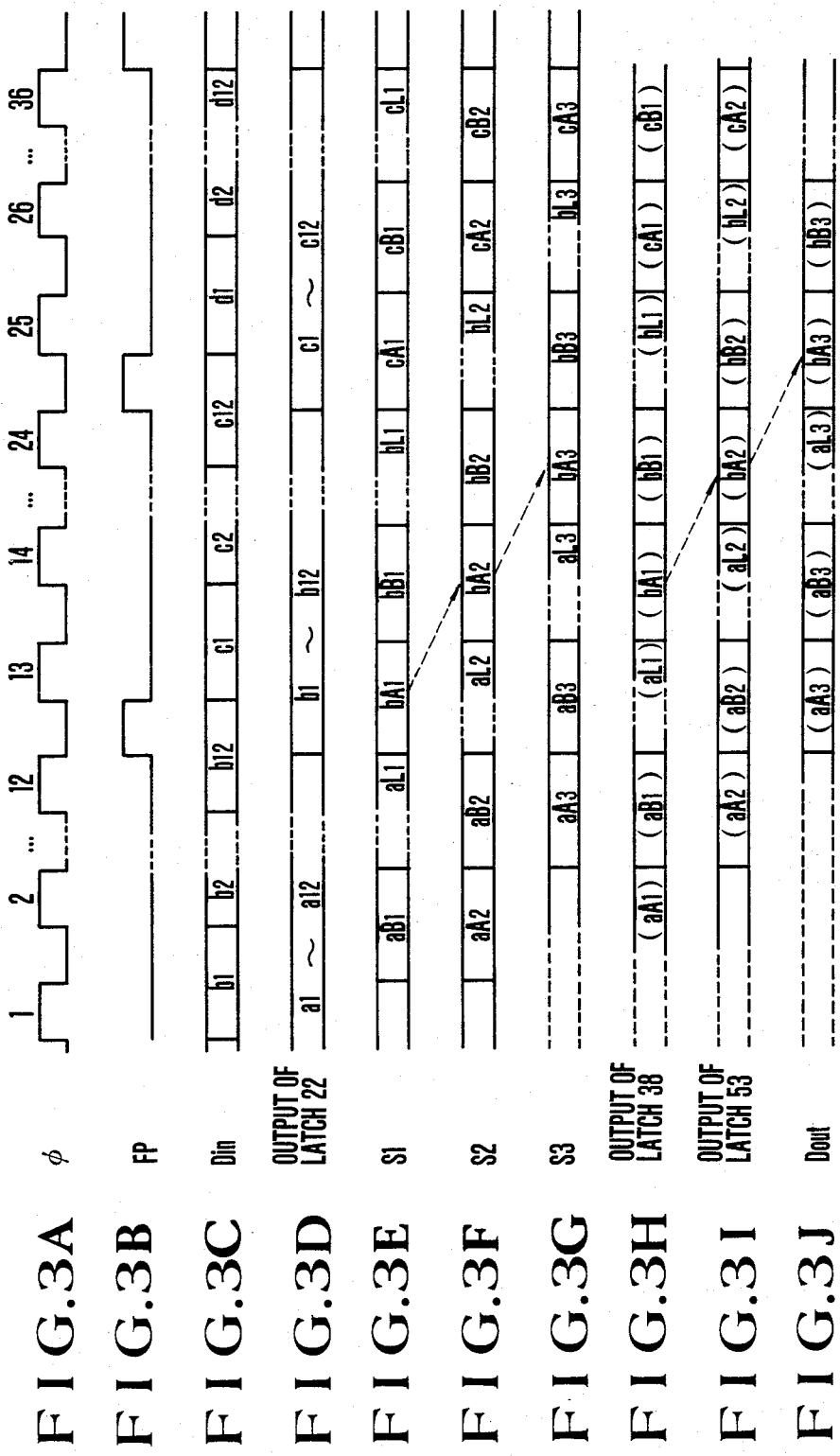
FIGS. 3A to 3J are timing charts showing the operation of the electronic time switch shown in FIG. 2.

In each frame, 12 data are taken into the shift register 21, and 12 data already taken in the previous frame are read out. As shown in FIG. 3C, between the first and 12th clock pulses $\phi$, data b1 through b12 are sequentially taken into the shift register 21. In the same manner, between the 13th and 24th clock pulses $\phi$, data c1 through c12 are taken in and between the 25th and 36th clock pulse $\phi$, data d1 through d12 are taken in. At the 12th clock pulse $\phi$ the frame pulse FP is generated so as to send to the latch circuit 22 data b1 through b12 which were taken into the register 21 in the previous frame (see FIG. 3D). In the same manner at the 24th clock pulse $\phi$ data c1 through c12 are taken in. On the other hand, the switch control memory device 63 sends out the read address for the data taken in the previous frame in synchronism with the clock pulse $\phi$. For example, during the 12 cycles following the 12th clock pulse $\phi$, random addresses bA through bL for reading out data b1 through b12 are sent out. Of these addresses, the decoded signal S1 (FIG. 3E) of the least significant bit (LSB) address bA1 is applied to multiplexers 23 through 28, so that data (bA1) selected by these multiplexers are sent to registers 38 through 43 (FIG. 3H) via registers 31 through 36. More particularly, at first 6 data are selected from data b1 through b12 latched in the latch circuit 22 and then held in registers 38 through 43. The operation of the registers 31 through 36 and 38 through 43 will be described in more detail taking register 31 and 38 as typical ones. Thus, while the previous stage 31 is taking in data, the later stage register 38 holds already taken in data. Considering the previous stage register 31 as a memory of the previous stage multiplexer 23 and the later stage register 38 as a memory of the later stage multiplexer 44, respective multiplexers constitute circuit modules of the same construction, each having latch circuits at the input and output ends.

After being delayed by one clock the partial address bA2 is sent to decoder 66 to form a decoded signal S2

(FIG. 3F). In response to this signal S2, multiplexers 44 through 46 select data bA2 which are sent to registers 53 through 55 via registers 49 through 51 (FIG. 3I). As a consequence, registers 53 through 55 hold three data selected by partial addresses bA1 and bA2 among data b1 through b12. The MSB address is further delayed by one clock and then supplied to decoder 68 to form a decoded signal S3(FIG. 3G). In response to this signal, the multiplexer 58 selects either one of three data (bA2) held in the registers 53 through 55. The selected data is held in the register 61 via the register 60 as data bA3 and then supplied to an external circuit.

The operation described above is executed continuously for addresses bB . . . bL . . . . More particalarly, by causing the multiplexers to act as a pipe line, reading out of random addresses can be made in parallel and at the same period as the application or the input data to the shift register. Moreover, as the data taken into a shift register is the same as the sequential writing, the operation described above has a time switch operation effected by a sequential writing and random reading.

It should be understood that the invention is not limited to the specific embodiment described above, and that various changes and modification will be obvious to one skilled in the art. For example, although in the foregoing embodiments the number of bits of the data is one the data may comprise a plurality of bits. For example, where an 8 bit data is to be processed, eight circuits shown in FIG. 2 are arranged in parallel.

As above described, in the electronic time switch of this invention, since the sequential writings are made by shift registers and the random reading out are made to act as a pipe line multiplexers constituted by registers and multiplexers, each operation can be made at a speed substantially equal to the operation speed (several tens $MH_z$ to several hundred $MH_z$) of the shift register. This speed is extremely high when compared with the cycle time of the memory device. In the embodiment shown in FIG. 2, since the number of speech paths (input shift registers and multiplexers) is proportional to the degree n of multiplexing, and the number of the control memory devices is proportional to $nlog_2n$, the number of these circuit elements are much smaller than that of gate matrixes which is proportional to $n^2$. Moreover, as it is possible to simultaneously write and read out, the number of required cycles can be reduced to one half of that of memory devices in which writing and reading out are made independently. Further, data are written into such memory circuits as registers, latch circuits of the like at each cycle or frame so that dynamic operable circuits may be used so as to fabricate the time switch with a lesser number of the elements and to operate with a smaller consumption of power.

Moreover, as the time switch can be formed by sequentially arranging multiplexer modules with small memory capacities, the time switch of the invention can be designed readily and is suitable for use in a LSI capable of integrating at a high density. Thus, a high speed and a large scale that have been impossible with a prior art memory device can be simultaneously accomplished which enables one to manufacture an economical telephone exchange of a small size and a low power consumption.

Figure 4:
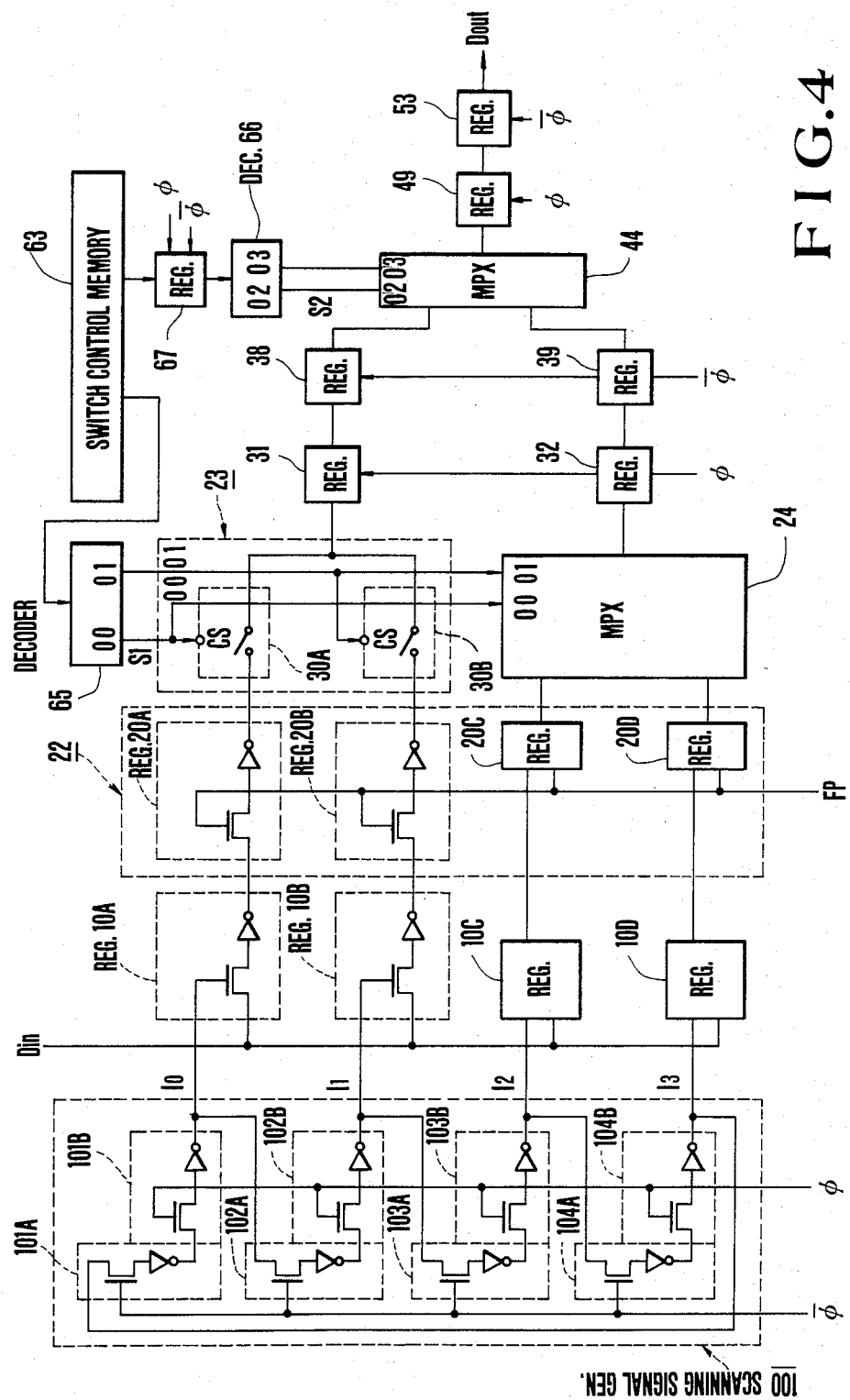
FIG. 4 is a block diagram showing another embodiment of the electronic time switch of this invention.

FIG. 4 shows another embodiment of the electronic time switch of this invention in which data are applied in parallel into the registers of the first stage, and data taken into respective registers is effected in synchronism with the output of a circulating type shift register having a control whose bit is "1". Where the shift registers as previously described are used, the shifting of information applied to the shift registers is effected in parallel by all memory elements constituting respective stages of the register so that all stages of the shift register consume dynamic power. Consequently where a highly multiplexed switch adapted to exchange a large number of different input information is formed, the number of shift registers increases so that the dynamic power also increases. Moreover, as the operating speed increases also, there is a problem of further increasing the dynamic power. More particularly, as the degree of multiplexing is increased n times, it is necessry to increase by n times the number of shift registers as well as the operating speed. Then the dynamic power becomes increased by $n^2$ times. Due to this increase in the dynamic power, inespective of the development of integrated circuit techniques, it is difficult to provide a switch circuit having a high degree of multiplexing with the construction described above.

Consequently, in the modification shown in FIG. 4, giving attention to the first stage of the electronic time switch, data are applied in parallel to memory elements adapted to store data, while at the same time data is inputted to only one memory element selected by a selection signal and data is outputted from the memory element designated by a control signal so as to limit to only one the memory element that invests its state at the time of telephone exchange operation, thereby decreasing the power consumption of the electronic time switch.

In FIG. 4, circuit elements having the same or similar functions as those shown in FIG. 2 and designated by the same reference characters. A scanning signal genrator 100 comprises a circulating type shift register and, in a ring form, four register pairs 101A, 101B, 102A, 102B, 103A, 103B and 104A, 104B each comprising a transfer gate circuit and an inverter. Each register pair is driven by clock pulses $\phi$ and $\bar\phi$ to take in and hold an input signal. In this case, only one register pair stores an information "1" and the other pairs store information "0". For example, each register pair is constituted by a MOS type flip-flop circuit. Consequently, the output terminals T1 through T3 sequentially output signals in synchronism with the clock pulses $\phi$ and $\bar\phi$.

Data Din are applied in parallel into the first registers 10A, 10B, 10C and 10D. More particularly, to the gate electrodes of the transfer gate circuits comprising these registers are applied the output signals of the scanning signal generator 100, which are shown by FIGS. 5D through 5G and to one input electrode of the transfer gate circuits is applied a data Din. Consequently the first registers 10A through 10D take in the input data Din shown by FIG. 5C in accordance with the outputs of the scanning signal generator 100, which are shown by FIGS. 5D through 5G, and when a frame pulse FP (sec FIG. 5B) is generated in synchronism with the last clock pulse $\bar\phi$ (having an opposite phase with respect to $\phi$), this frame pulse FP is stored in the latch circuit constituted by the second registers 20A, 20B, 20C and 20D.

Figure 5:
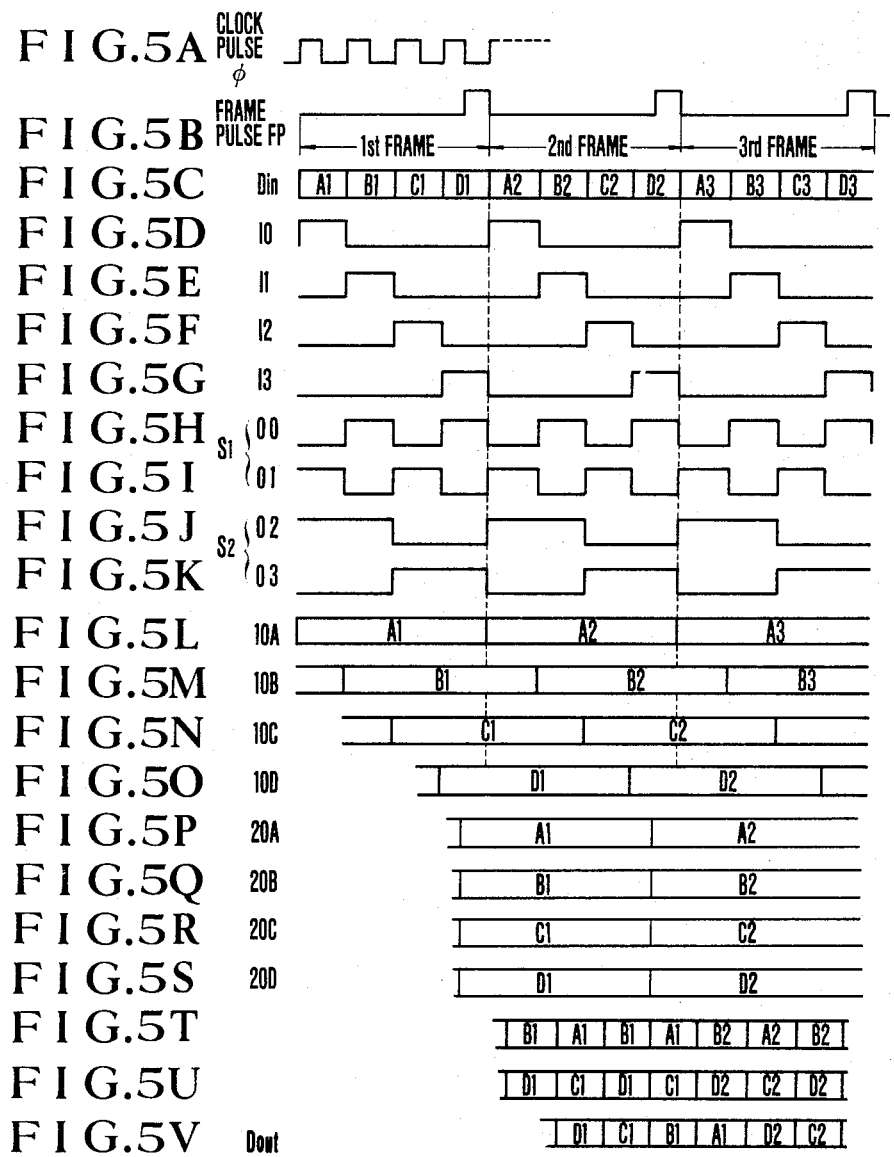
FIGS. 5A to 5V are timing charts explaining the operation of the electronic time switch shown in FIG. 4.

Suppose now that multiplexed four data A,B,C and D are inputted at each frame in the order mentioned. Thus, as shown in FIG. 5C, it is assumed that the data Din comprises A1, B1, C1 and D1 for the first frame, A2, B2, C2 and D2 for the second frame, A3, B3, C3 and D3 for the third frame. Since the scanning signal generator 100 sequentially shifts the initial data that is $I_0=1$, $I_1=0$, $I_2=0$ and $I_3=0$ for the first cycle, the selection signals (I0, I1, I2 and I3) would become (0,1,0,0) and for the second cycle, (0,0,1,0) for the third cycle and (0,0,0,1) for the fourth cycle. At the first portion of the second cycle, the data return to the initial data and this operation is repeated at each four cycles. Accordingly, in the first frame, among first registers 10A through 10D comprising a data memory element, only the first register 10A receives input data A1 in the first cycle, in the second cycle, only the register 10B receives input data B1, in the third cycle, only register 10C receives input data C1, while in the fourth cycle, only the register 10D receives input data D1. Thus, after a lapse of one cycle these registers hold the input data when the selection signal becomes "0". Thereafter, this operation is repeated at every four cycles. As a consequence, at every four cycles, the first register 10A stores data B, the first register 10C data C, and the first register 10D data D. These states are shown in FIGS. 5L through 5O. In this manner, the input data are stored in these first registers. Then the data is transfered into the corresponding second registers 20A through 20D as shown in FIGS. 5P through 5S by the action of the frame pulse FP shown in FIG. 5B.

The operation of previous output data from the input data will now be described. Thus, the operation is executed by either one of the four second registers of the second stage latch circuit 22 by a control signal S1 (OO,O1) shown in FIGS. 5H and 5I sent out from the switch control memory device 63. Thus when the control signal S1 (OO) applied to the switch 30A is "0" and the input signal S1(O1) supplied to the switch 30B is "1", the second registers 20B and 20D are selected to send their outputs B1 and D1 to registers 31 and 32 respectively in the next stage. When the control signal S1(OO) applied to switch 30A is "1" and the signal "O1" supplied to switch 30B is "0", the first registers 20A and 20C are selected to produce outputs A1 and C1 respectively. In response to clock pulses $\phi$ and $\bar\phi$, the first and second registers 31, 32 and 38, 39 sequentially shift the input data thereto so as to sequentially store these data in the second registers 38 and 39. These states are shown in FIGS. 5T and 5U. Under these states the multiplexer 44 is supplied with a control signal S2 (O2,O3) shown in FIGS. 5J and 5K. Consequently the multiplexer 44 sequentially selects the data stored in registers 38 and 39 as shown in FIG. 5V to sequentially store the selected data in registers 49 and 53 and then send them to the succeeding stage as an output Dout. As shown in FIG. 5V the output data comprises has an order of D, C, B and A which is different from the order A, B, C and D at the time the input data is applied.

Figure 6:
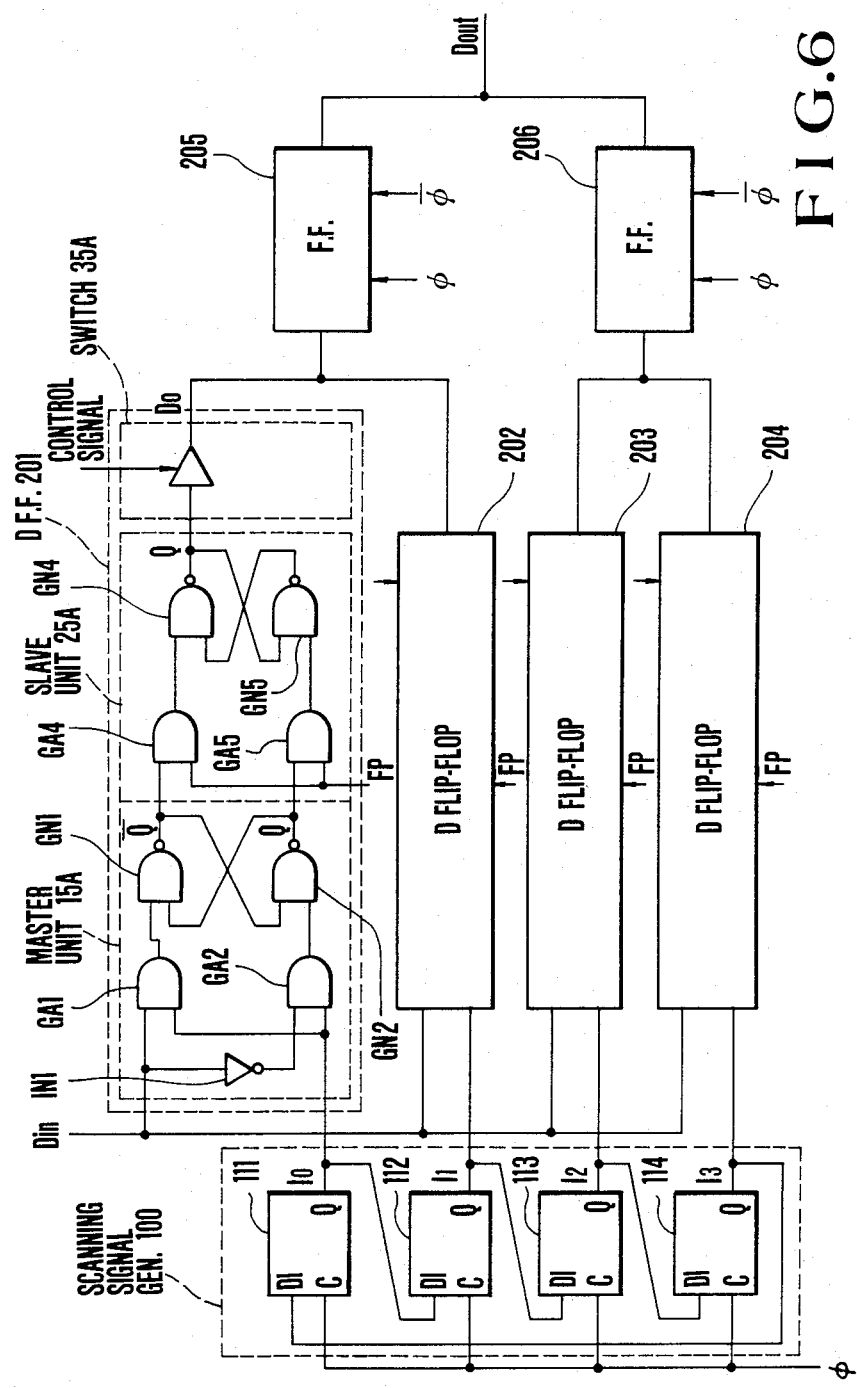
FIG. 6 is a block diagram showing another embodiment of the electronic time switch according to this invention.

FIG. 6 illustrates still another embodiment of time switch according to FIG. 6 in which the first and second registers and the switches are constituted by master-slave type D flip-flop circuits. In the same manner as the embodiment shown in FIG. 4, in FIG. 6, the scanning signal generator 100 is constituted by circulating shift register utilizing the D flip-flop circuit. Consequently the outputs I0 to I3 of the scanning signal generator 100 are applied to the input terminals of the D flip-flop circuits 201 to 204. Taking the D flip-flop circuit 201 as a typical one, its construction will be described. The D flip-flop circuit 201 comprises a master unit 15A, a slave unit 25A, and a switch unit 35A. The master unit 15A is constituted by two AND gate circuits GA1 and GA2, NAND gate circuits GN1 and GN2, and inverters IV1 and IV2 and functions in the same manner as the first register 10A shown in FIG. 1. The AND gate circuit GA1 receives the data Din and the output I0 of the scanning signal generator 100 to supply its output to one input of the NAND gate circuit GN1. The AND gate circuit GA2 is supplied with the data Din via inverter IN1 and the output I0 of the scanning signal generator 100 to apply its output to one input of NAND gate circuit GN2. As a consequence, when supplied with the output I0 from the scanning signal generator 100 the AND gate circuit GA1 of the master unit 15A produces an output when the inputted data Din is "1", whereas the AND gate circuit GA2 produces an output when inputted data Din is "0". Accordingly, these AND gate circuits GA1 and GA2, and inverter IN1 operate in the same manner as the transfer gate FET1 shown in FIG. 1. The inputs and outputs of the NAND gate circuits GN1 and GN2 supplied with the outputs of these gate circuits are cross-connected to form a flip-flop circuit. When supplied with the output of the AND gate circuit GA1, the output Q of the NAND gate circuit GN1 becomes "0", while the output Q of the NAND gate circuit GN2 becomes "1". These outputs are applied to the input terminals of the slave unit 25A.

The slave unit 25A includes AND gate circuits GA4, GA5 and NAND gate circuits which operate in the same manner as the second register 20A shown in FIG. 1 does. When receiving the frame pulse FP, the AND gate circuits GA4 and GA5 are enabled so that the AND gate circuit GA4 sends to the input of the succeeding NAND gate circuit GN4 the Q output of the NAND gate circuit GN1 of the master unit 15A, and the AND gate circuit GA5 also sends to the the input of succeeding NAND gate circuit GN5 the Q output of the NAND gate circuit GN2 of the master unit 15A. These NAND gate circuits GN4, GN5 are cross-connected to constitute a flip-flop. Therefore, when the $\overline{Q}$ output of the NAND gate circuit GN1 of the master unit 15A is sent out, the Q output is not sent out from the NAND gate circuit GN2 and in reverse, when the Q output of the NAND gate circuit GN2 is sent out, the Q output is not produced.

The output of the slave unit 25A, that is the Q output of NAND gate circuit GN4 is sent to switch 35A which assumes three states, i.e., "1" or "0" (a high impedance state determined by the output of the slave unit 25A while a control signal is being applied) and a high impedance state when no control signal is given. The output side of switch 35A is commonly connected to the D flip-flop circuit 202 in the same stage and connected to receive the output I1 of the flip-flop circuit 112 of the scanning signal generator 100, and then supplied to a D flip-flop circuit 205 of the next stage.

With this construction, since input and output operations of various elements are substantially the same, in the embodiment shown in FIG. 4, its description will not be repeated again. The D flip-flop circuit 205 disposed on the output sides of the D flip-flop circuits 201 and 202, and the D flip-flop circuit 206 disposed on the output side of D flip-flop circuits 203 and 204 has the same construction as the D flip-flop circuit described above. However, the timing signal I0 applied to the AND gate circuits GA1 and GA2 of D flip-flop circuit 201 is replaced by the clock pulse 100 and the frame pulse FP the timing signal applied to the inputs of the AND gate circuits GA4, GA5 is replaced by the clock pulse $\phi$. It should be noted that, where a three state switch is used, as has been described in connection with switch 35A, when the switch is not selected a high impedance can be provided, there is an advantage that such special elements as an OR gate circuit utilized to commonly connect the output sides of the flip-flop circuits 201 and 202 can be eliminated. The three state switch used in this embodiment may be constituted by a transfer gated FET transistor, for example.

Figure 7:
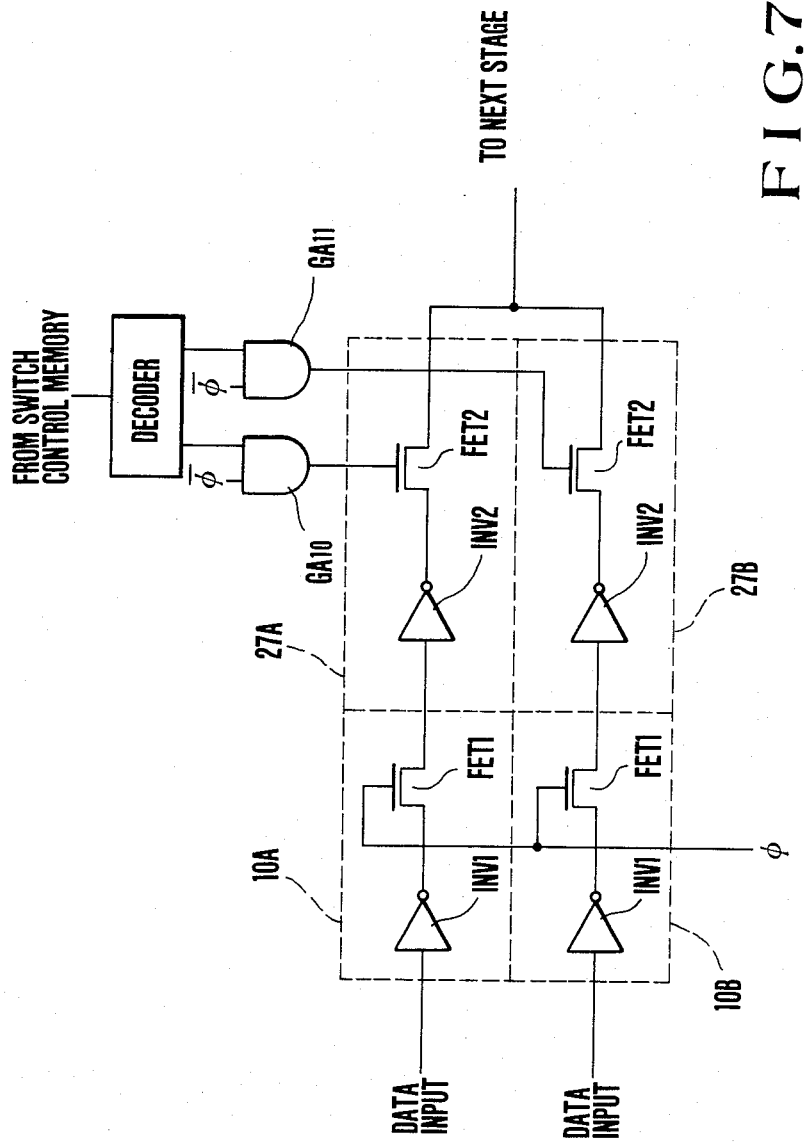
FIG. 7 is a connection diagram showing a modified minimum structured element utilized in this invention.

Although in the embodiments shown in FIGS. 2 and 4, the minimum stsructural element was constituted by a combination of two shift registers and a switch, one of the registers can also be used as the switch. Such a construction is illustrated in FIG. 7, in which each of the first registers 10A and 10B is constituted by a combination of an inverter and a transfer gate like the above described embodiments, but it differs in that an inverter INV1 is connected in the preceding stage of the transfer gate FET1. This transfer gate FET1 is driven by the clock pulse $\phi$ for supplying the output of inverter INV1 to combine second register and switch 27A, 27B on the succeeding stage that hold the input data. The combined shift register and switch 27A, 27B includes an inverter INV2 and a transfer gate FET2 which receives and holds the outputs of the first transistors 10A and 10B. The transfer gate FET2 is supplied with one of the control signals supplied from the switch control memory device via a decoder by the timing action of clock pulse $\phi$ 180° dephased from the clock pulse $\phi$ given to the transfer gate of the first register, the clock pulse $\phi$ enabling the AND gate circuits GA10 and GA11. This modification provides not only the switch control function of the second register but also the transfer operation of the switch. The output of the transfer gate FET2 of registers 27A and 27B are commonly sent to the succeeding stage.

Although in FIG. 1, the common connection of the switches 30A and 30B and the basic structural element was provided by the combination of an AND gate circuit and an AND gate circuit, in an actual LSI technique, the common connection can be provided by a composite gate circuit. Furthermore, in FIG. 4, the transfer gate and the inverter of each stage were constructed as an integrated circuit of a MOS construction, it will be clear that the same operation can also be provided with an integrated circuit of a CMOS construction although where a CMOS construction is used. Although timing signals are added so that the circuit construction becomes more or less complicated, the basic construction is the same as the integrated circuit of the MOS construction.

Furthermore, in the foregoing embodiments, the control signal outputted from the switch control memory device was delayed one bit for succeeding stages such delay may be made when prestoring the control signal in the switch control memory device.

What is claimed is:

1. An electronic time switch comprising
a plurality of successive stages, each stage having one or more units and each unit including serially connected first and second registers operating to receive input data at different times and a switch connected to the output of each second register, the operation of said switch being controlled by a control signal;
the units of a stage being formed as one or more groups thereof, the number of units in a stage other than the first stage being the same as the number of groups in a preceding stage;
the switches in each group of a stage having a common connection point, the connection points of the group in a preceding stage being connected to the first registers in the units of a succeeding stage, which units correspond to the groups in said preceding stage;
means for sequentially applying control signals having different switch connection times at predetermined time spacings to the switches in said stages;
the first registers of the first stage sequentially storing sequentially applied data at a first time;
means for applying a common frame pulse to the second registers of the first stage for storing the contents of respective first registers;
the first registers of the second and succeeding stages sequentially storing data at a second time; and
the second registers of the second and succeeding stages sequentially storing data at a third time which is synchronous with but different from the second time, thereby providing data, which has been stored at a predetermined time, at a different time.

2. The electronic time switch according to claim 1 wherein said first and second registers each respectively comprises a combination of transfer gate circuits and inverters.

3. The electronic time switch according to claim 1 wherein each of said first and second registers comprises a master-unit and a slave unit of a master-slave type D flip-flop circuit.

4. The electronic time switch according to claim 1 wherein the first registers of the first stage comprise a portion of a shift register having a plurality of stages, data applied to one terminal of the shift register being sequentially shifted through their shift register according to clock pulses.

5. The electronic time switch according to claim 1 wherein a control signal applied to the switches of the groups of units of respective stages is produced by decoding address information read out from a switch control memory device.

6. The electronic time switch according to claim 5 which further comprises means which delays the control signals for respective stages by delaying the address information by one bit with respect to the control signal of a preceding stage.

7. The electronic time switch according to claim 1 wherein data are applied in parallel to the first registers of the first stage according to a timing signal from a circulation type shift register which generates a timed scanning signal.

8. The electronic time switch according to claim 1 wherein respective stages of the circulation type shift register comprise a D type flip-flop circuit.

9. The electronic time switch according to claim 1 wherein said first registers comprise a combination of a transfer gate and an inverter, said second registers and said switch comprise a combination of another transfer gate and another inverter, respective transfer gates of a pair of said second registers being connected to receive different control signals through AND gate circuits supplied with clock pulses different from that of the first registers.

* * * * *

UNITED STATES PATENT AND TRADEMARK OFFICE
CERTIFICATE OF CORRECTION

PATENT NO. : 4,538,260
DATED : August 27, 1985
INVENTOR(S) : Nikaido

It is certified that error appears in the above-identified patent and that said Letters Patent is hereby corrected as shown below:

Col. 1, l. 19: change "satelite" to --satellite--

Col. 1, l. 49: change "a operating" to --an operating--

Col. 3, l. 5: change "elctronic" to --electronic--

Col. 5, l. 22: change "inforamtion" to --information--

Col. 6, l. 5: change "meomory" to --memory--

Col. 6, l. 16: change "which" to --and-- and "and" to --which--

Col. 7, l. 14: change "paricalarly" to --particularly --.

Col. 8, l. 8: insert --data-- after "input" and before "information"

Col. 8, l. 13: change "necessry" to --necessary--

Col. 8, l. 17: change "inespective" to --irrespective--

Col. 8, l. 34: change "genrator" to --generator--

UNITED STATES PATENT AND TRADEMARK OFFICE
CERTIFICATE OF CORRECTION

PATENT NO. : 4,538,260

DATED : August 27, 1985

INVENTOR(S) : Nikaido

Page 2 of 3

It is certified that error appears in the above-identified patent and that said Letters Patent is hereby corrected as shown below:

Col. 9, l. 31: insert --is-- after "(00)" and before "applied"

Col. 10, l. 33: delete first occurrence of "the the"

Col. 10, l. 64: change "100" to --$\phi$--

Col. 11, l. 9: change "stsructural" to --structural--

| | | |
|---|---|---|
| Col. 4, l. 15: (second occurrence) | ] | |
| Col. 4, l. 21: | ] | |
| Col. 4, l. 25: | ] | |
| Col. 4, l. 34: | ] | |
| Col. 4, l. 54: (second occurrence) | ] | |
| Col 5, l. 2: | ] | |
| Col. 5, l. 14: (second occurrence) | ] | change "$\phi$" to --$\bar{\phi}$-- |
| Col. 5, l. 32: | ] | |
| Col. 5, l. 43: | ] | |
| Col. 5, l. 58: (second occurrence) | ] | |
| Col. 6, l. 1: (second occurrence) | ] | |
| Col. 6, l. 16: (second occurrence) | ] | |
| Col. 6, l. 28: (second occurrence) | ] | |

UNITED STATES PATENT AND TRADEMARK OFFICE
CERTIFICATE OF CORRECTION

PATENT NO. : 4,538,260

DATED : August 27, 1985

INVENTOR(S) : Nikaido

Page 3 of 3

It is certified that error appears in the above-identified patent and that said Letters Patent is hereby corrected as shown below:

Col. 8, l. 39: (second occurrence) ]
Col. 8, l. 45: (second occurrence) ]
Col. 8, l. 58: ] change "$\phi$" to --$\bar{\phi}$--
Col. 9, l. 39: (second occurrence) ]
Col. 10, l. 67: ]
Col. 11, l. 28: (second occurrence) ]

Signed and Sealed this

*Twelfth* Day of *August 1986*

[SEAL]

*Attest:*

DONALD J. QUIGG

*Attesting Officer*

*Commissioner of Patents and Trademarks*